Oct. 13, 1964   W. C. FLANAGAN ETAL   3,153,113
ELECTROPLATING LIGHT VALVE
Filed Jan. 26, 1961
2 Sheets-Sheet 1
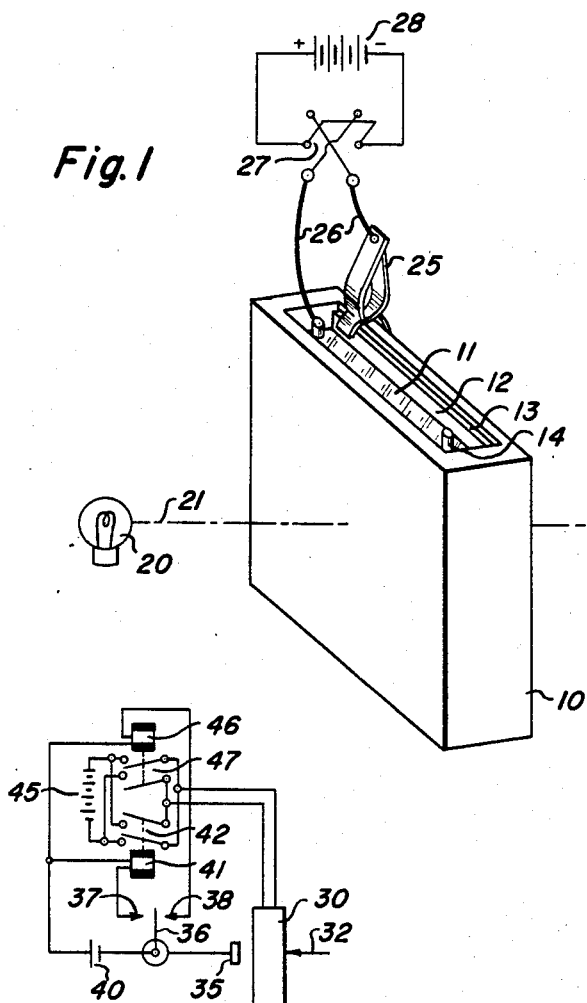
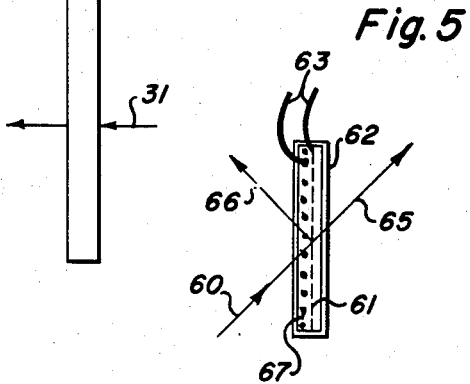
WILLIAM C. FLANAGAN
CLIFFORD L. MILES
INVENTORS
BY R. Frank Smith
F. M. Emerson Holm
ATTORNEYS Oct. 13, 1964

W. C. FLANAGAN ETAL 3,153,113

ELECTROPLATING LIGHT VALVE

Filed Jan. 26, 1961

William C. Flanagan
Clifford L. Miles
INVENTORS

BY R. Frank Smith
F. M. Emerson Holm
ATTORNEYS ns # United States Patent Office 3,153,113
Patented Oct. 13, 1964

3,153,113
ELECTROPLATING LIGHT VALVE
William C. Flanagan, Rochester, N.Y., and Clifford L. Miles, Simsbury, Conn., assignors to Eastman Kodak Company, Rochester, N.Y., a corporation of New Jersey
Filed Jan. 26, 1961, Ser. No. 85,161
9 Claims. (Cl. 88—61)

This invention relates to light filters for use in optical systems or as windows in buildings or vehicles.

This is a continuation-in-part of our application Serial No. 712,700, filed February 3, 1958, now abandoned.

It is the object of the invention to provide a filter of variable density, usually, but not necessarily, neutral in color. The density may be increased or decreased without any mechanical movement and the range is from a very low density to a very high density or effectively opaque. In the preferred embodiment, the density is substantially neutral and it remains free from color at all density levels. The low density end of the range is substantially transparent and lower than that usually obtainable with other variable density filters, such as those of the polarizing type. A special object of the invention is to provide a variable density filter practically unlimited in size. The filter can be quite thin, or fairly thick if added strength is required. It may be quite small or as large as a normal store front window. Light filters according to the invention are capable of not only controlling the light transmitted, but also the light reflected.

According to the invention a filter comprises two parallel sheets of clear light transmitting material separated a distance between .001 inch and .300 inch. When the filter is used in a precise optical system, the surfaces of these sheets are of optical quality. Between the two sheets is a transparency electrolyte which is usually a metal electrolyte such as an acid solution of a metallic salt, but various forms of electrolytes may be used as discussed below. The ions are plateable as a non-diffusing material. Two electrodes are included and at least one of the electrodes is substantially transparent and is transverse to the path of light through the electrolytic cell.

This transparent electrode may be slightly colored in some embodiments, such as a thin layer of gold, or may be neutral. Similarly, the electrolyte may be colored but is in all cases substantially transparent, i.e. non-diffusing. Dyes may be added to neutralize the residual color of the electrolyte or to selectively enhance the optical properties of the system. The surface of the electrode may be textured so that when plated it appears slightly diffusing but even so the electrode, the electrolyte and the plated material are all non-diffusing materials. When the electrode is flat, the material plated thereon reflects, absorbs and transmits portions of the light incident thereon, but does not diffuse it. The surface on which the transparent electrode is placed, usually is one of the transparent sheets but may be a separate support of any transparent material such as plastic or glass. The surface is usually smooth and flat but in special embodiments has a random irregular structure like a sand blasted or pebbled finish or consists of array of specially oriented optical surfaces such as lenticules or minute mirrors. In fact, in some cases the entire surface has a non-plano shape, concave or convex so that the filter has optical power with respect to the light reflected or transmitted.

The other electrode may also be (1) transparent or may be (2) in the form of a rod or ring outside the useful light path between the windows. In very large filters for building windows, the main electrode usually consists of a continuous transparent electrode of moderate conductivity, about 1000 ohms per square, with a fine grid of higher conductivity, say 100 ohms per square between the support and the continuous transparent electrode. The fine grid covers only 5% of the surface area and serves to equalize the current over the whole window.

When a D.C. current is passed through this cell in one direction, it plates metal or other material from the electrolyte onto the main transparent electrode, increasing the density thereof very rapidly. For example, 8 ma. per square centimeter current density will plate silver at such a rate that it produces about 0.04 unit of density per second. This is a somewhat higher rate than is usually used with the invention, but it is still well within the range of operation. When the current is in the other direction, it will plate the metal off the electrode into the ionic solution and since this solution is more transmitting than the plated electrode, the density of the filter is reduced. The other electrode is usually an inert metal or conductor such as carbon, but there is some advantage in using a material for supplying additional ions from this electrode to the electrolyte, when this other electrode is a rod or ring outside of the path of light.

The spacing between the light transmitting sheets as mentioned above is between .001 inch and .300 inch. For windows of buildings the thinner separations are used and in certain preferred embodiments of the invention the electrolyte itself contains a minimum of metallic ions at any one moment. The ions for plating on the cathode are provided by the anode (or by a salt bridge layer discussed below) spaced from the cathode this very small distance. A preferred spacing with appreciable ion concentration in the electrolyte, but still insufficient to provide a completely opaque coating quickly, is between .01 and .02 inch.

On the other hand when sufficient concentration and sufficient amount of electrolyte are required for high speed production of opaque layers, the thickness of the cell is preferably in the .1 to .3 inch range. All of these spacings are within the overall range above-specified. The electrodes are preferably inert to the electrolyte although the plating action transfers metal from the electrodes to the electrolyte and vice versa. One preferred form of electrolyte contains sufficient gelatin to be solid at room temperature and up to 90° F. Instead of gelatin, polyacrylamide (American Cyanamid Company) when added to various electrolytes (3 to 12% solution) has been found to improve the uniformity of metal deposition on the main electrode. Such electrolytes have increased viscosity. This use of polyacrylamide in the main electrolyte (for such secondary functions) should not be confused with the use of this same material as the electrolyte itself, in one form of the salt bridge cell discussed below.

The use of a salt bridge layer between a double electrolyte sandwich constitutes a preferred form of cell according to the present invention. The main electrolyte on one side of the salt bridge contains the ion which is to be converted to an atom or molecule and deposited on the main transparent electrode. This main ion migrates back and forth during operational cycles of the filters between the main electrode and the salt bridge layer. However, it is never deposited out on the salt bridge layer. A second electrolyte containing a transparent ion is located on the opposite side of the salt bridge layer and in contact with the second electrode surface. The ion in this second electrolyte does not undergo a change in optical density when deposited on the second electrode. The salt bridge layer carries current across the boundary between the two electrolytes without migration of the main electrolyte ion, usually a metal ion, into the second electrolyte. Similarly the layer prevents the second transparent ion from migration into the main electrolyte. In one example a salt bridge layer consists of a saturated solution of potassium chloride in gelatin. Such salt layers are useful when the electrolytes do not contain soluble silver, mercurous or thallous salts. A saturated solution of ammonium nitrate in gelatin constitutes a satisfactory salt bridge layer when silver salt solutions are used.

Reference is made to the handbook entitled "1957 Metal Finishing Guidebook Directory," published (annually) by Finishing Publications Inc., 381 Broadway, Westwood, New Jersey. This handbook is merely representative of the many books available on electroplating. The present invention is not concerned with any particular plating system. Any of the systems described in the handbook which deposit a non-diffusing conducting material onto a cathode (or anode in a few cases) are reversible and may be used, the only limitation on the equipment being the requirement that one of the electrodes be substantially transparent and across the light path between the two transparent plates which act as the entrance and exit windows. It is important to note that the present invention does not impose requirements on the plating system or technique anywhere near as severe as those imposed by metal finishing processes described in the above-mentioned handbook, for example. Most metal finishing processes using electrolytic deposition require: (1) a wear resistant surface having a fairly thick electrolytic deposition; (2) severe abrasion resistant specifications calling for a high degree of adhesion between the deposited material and the adjacent substratum; (3) a deposited non-spongy or non-porous surface and free from anode and cathode slime; (4) a high current density in both the electrolyte and electrodes; (5) a replenishment process for either the electrodes or material for the electrolyte. These are not objectionable characteristics but the important point is that they are not essential to the present invention. Thus many chemical electrolytes and electrodes have been found applicable to the invention even though they would be unacceptable to any metal finishing electrolyte deposition processes; for example soft coatings as long as they are non-diffusing are acceptable with the present invention. Replenishment is generally unnecessary because of the reversal nature of the invention alternately plating and deplating. Also the thicknesses of the depositions in the present invention are usually less than a few millimicrons. Thus problems common to plating procedures which occur only at high current densities, such as gas formation, are not normally present in the variable density filters here described. Accordingly it is possible to seal the cell for protection against dust and the like. Alternatively the cell may be vented to remove any gases which might be evolved.

In some embodiments of the invention, the electrolyte is made highly viscous by the addition of gelatin for example, usually enough so that the system is solid up to at least 90° F. Similarly ethylene glycol may be added to the electrolyte as an antifreeze. The separately heated electrodes, discussed below eliminate the need for antifreeze electrolytes.

In some embodiments, particularly the very thin ones, both the cathode and the anode are transparent and are on the inner surfaces of the two outer sheets or on separate supports. Plating onto the cathode proceeds according to the invention. However, when the current is reversed to plate off the cathode, provision must be made to prevent plating onto the anode. This may be accomplished by the use of a salt bridge layer as discussed above so that no density is formed at the anode.

In a number of cases it is desirable to provide, in addition to the electroplating current which is the essential feature of the present invention, a secondary current usually transverse to the cell or obliquely across it and usually alternating current. This has many useful effects. In the case of large area filters such as windows, the superimposed alternating current tends to promote uniformity of the plating on and plating off operations. It reduces the tendency of the plating action to concentrate in the areas of the first electrode which are nearest to the second electrode which may be a wire mesh. Such transverse currents have been found particularly useful in large filters such as those 1 foot square or more.

A second useful effect of the secondary, transverse, alternating current is its heating effect. The intensity of the transverse current can be controlled independently of the current used for optical density and hence the filters can be held at a substantially uniform temperature. This insures uniformity of the plating operation even when the filters are in contact with very low temperatures.

Variable density filters according to the present invention find a variety of uses. The simplest form is a window in a house or office or in a land, air or space vehicle. A preferred form for such applications is operated by a photoelectric control to increase in density whenever the outside intensity is high and to decrease in density when the outside intensity of illumination falls. In the above applications, the support surface for the transparent electrode usually has a flat profile but may have a random irregular structure like a pebble finish, with the index of refraction of the electrolyte and the transparent electrode such that the pebble surface is barely visible by reflection, at least until a highly reflecting film is deposited onto this pebble surface of the transparent electrode by the process herein described. In any of these embodiments in which the surface area of the window covers several square feet, a fine transparent conducting grid is usually included underneath the continuous transparent electrode, to maintain a uniform electrical field across the large area involved. On the other hand it is possible purposely to produce a non-uniform coating if desired merely by placing a second grid electrode nearer the areas on which more plating (or deplating) is desired. The photoelectric control may be reversed so that the maximum amount of daylight is admitted to the house but the windows become substantially opaque at night when the illumination comes from the inside. It is sometimes desirable to construct large windows or even fairly small ones of smaller square or hexagonal filters juxtaposed and wired independently or in parallel or in series.

The invention is also particularly useful in optical instruments when mechanical movement and vibration must be avoided. Some optical instruments are sensitive to changes in the polarization of the incident light but the present invention provides a variable density device which does not change the polarization of the transmitted light. One particularly useful application of the present invention is to time lapse photography. In such use the filter is placed partly in front of the camera lens and partly in front of a photoelectric cell which controls a power source which changes the density of the filter to hold the transmitted light constant and thus to provide constancy of illumination for the series of exposures made at relatively long time intervals. Neutral filters according to the invention are particularly useful in color photography since such filters remain effectively non-diffusing, non-depolarizing and neutral at all densities and do not affect the color rendition.

Other objects and advantages of the invention will be apparent from the following description when read in connection with the accompanying drawing, in which:

FIG. 1 is a perspective illustration partly schematic of a preferred embodiment of the invention.

FIG. 2 is a cross section in plan of the filter shown in FIG. 1.

FIG. 3 is a schematic illustration of a constant illumination filter according to the present invention.

FIG. 4 is a cross section of a different embodiment of the invention.

FIG. 5 shows a variable reflectivity filter according to the invention.

Figure 6:
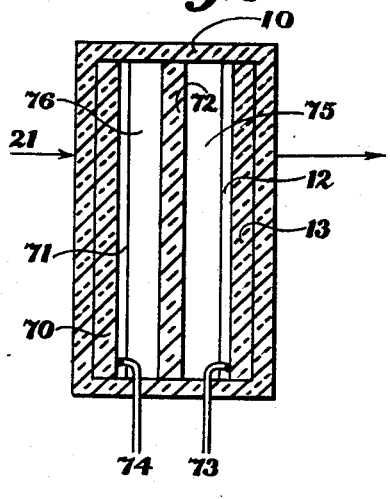
FIG. 6 shows an enlarged cross section of a special embodiment of the invention.

In FIGS. 1 and 2 a glass container 10 is partly filled with an electrolyte 11. A transparent electrode 12 coated on the surface of a separate glass plate 13, effectively covers one side of the cell so that the light 21 from the lamp 20 must pass through this electrode 12 enroute to a photocell 22. The other electrode 14 is shown in the form of a U-shaped member, but in practice a complete ring is used to insure uniformity of plating. Although the electrolyte and electrode may have various, almost innumerable, forms, specific materials are now given as examples. The electrolyte may consist of a solution of copper perchlorate $Cu(ClO)_4$ with 10% $HClO_4$ with a concentration of 1.5 gm./l. of Cu. The transparent electrode is a thin coating of tin suboxide (coated in an oven at 400° C. in an atmosphere of tin chloride and water vapor) the optical density of this layer alone being about .1 or less. Such conducting glass layers are commercially available. The specific resistance is about 200 ohms per square, but specific resistances as high as 3000 ohms per square still give quite useful results, and useful results can be obtained with resistances even 10 times higher than this. The other electrode is a silver ring or a gold plated rod bent in the form of a U (as shown) or preferably in the form of a ring.

Through a clamp 25 and wires 26, the electrodes are connected to a double throw switch 27. In one position of this switch 27 the current from battery 28, or other source of D.C. power, is such as to plate metal from the copper perchlorate solution 11 onto the tin oxide transparent electrode 12, thus increasing the density of the latter. Only a few volts (e.g., 1.8 volts) are necessary to provide the required current density at the electrode 12 and such a current will provide an optical density of 1.0 unit in 30 to 60 seconds.

In FIG. 3 a variable density filter 30 similar to that shown in FIGS. 1 and 2 is arranged so that part of the light 31 is transmitted for whatever purpose the filter is used. For example the light 31 may be the light transmitted within an optical instrument or it may be merely daylight passing through a window. However, part 32 of the illumination passes through the variable density filter 30 so as to strike a photoelectric cell 35. This is connected to a meter type switch 36 which is open in the neutral position but which closes against contact 37 when the current is too high and closes against the contact 38 when the current from the photoelectric cell is too low.

When the contact 37 is closed, power from a battery 40 energizes a solenoid 41 and closes the two switches 42 so that power flows from the battery 45 to the cell 30 in order to plate on the transparent electrode thereof. This increases the density and cuts down on the amount of light falling on the photoelectric cell 35. This causes the contact 37 to open again and the meter needle 36 remains in this central position as long as the light intensity falling on cell 35 continues at the proper level. The photocell 35 may be sensitive in the ultraviolet, visible or infrared regions. Similarly when the light is not bright enough, the contact 38 is closed and the solenoid 46 is energized closing switch 47 which causes the current from the battery 45 to deplate the transparent electrode in the cell 30. The light 31 is controlled in exactly the same way as the light 30 and hence the light transmitted by the cell remains substantially constant. This simple embodiment of the invention is useful in time lapse photography. A motion picture camera arranged to expose one frame per minute say, may be placed behind the filter to receive the light 31 from an object such as a flower bud which is opening in daylight. As the intensity of daylight changes, relatively slowly, the exposure can be kept constant by the simple means shown in FIG. 3.

FIG. 4 is included merely to show some variations of the cell. In FIG. 4 one of the windows 50 is curved so that the electrolyte acts as a lens and the other window 51 is, itself, in the form of a negative lens, the surface 52 of which constitutes the transparent electrode. The other electrode 53 is located in contact with the far corners of the container. This particular container is sealed and the wires 54 are brought out through the cap 55 of the cell.

FIG. 5 illustrates the total effect of the invention with respect to light 60 incident on the transparent electrode shown by broken line 61. One of the most interesting uses of the present invention is as a variable beam splitter or simply as a variable mirror.

The filter cell 62 contains the electrolyte and two electrodes, 61 being the main transparent one and 67 being a wire mesh uniformly spaced from the electrode 61. Current is supplied to the electrodes through leads 63. The light 60 striking the electrode 61 is partly reflected along line 66, partly transmitted along line 65 and partly absorbed. Both the transmitted light 65 and the reflected light 66 may be slightly diffused. As the filter layer 61 increases in density, the intensity of the transmitted light 65 goes down and the intensity of the reflected light 66 goes up.

The transparency of the electrode itself is an important factor in the present invention. For most purposes, it is desirable to have this electrode as transparent as possible at least within the spectral range in which the filter is to be used. At the same time, it is preferable to keep the specific resistance of the electrode fairly low so that relatively low voltages applied thereto will give high current densities. The lower the resistance, the lower the optical transmission for any one material. Those familiar with the electroplating art do not normally consider using high resistance electrodes. However, we have found that such electrodes are quite capable of being plated and since only very thin platings are required for optical filters, the present invention turns out to be quite operable and useful.

This invention covers the filtering and reflection of light energy in the ultra violet, visible and infrared energy regions all of which are included in the term "light." In the embodiments of the invention in which only the reflected light is utilized, the reflection may be from either side and the form of the second electrode is not critical particularly when it is behind the transparent electrode which is the reflecting one in this case. The optical quality of the reflecting surfaces in the reflection embodiments of the invention is definitely comparable to commercially available optical quality mirrors produced by other methods; it is very good.

A filter according to a special embodiment of the invention includes optical diffusing properties which are determined by the surface of the transparent electrode. The plating material itself is non-diffusing. One embodiment, for example, has the surface sand blasted to produce a highly random oriented surface condition. An evaporated electrode placed on this support conforms to the surface structure. The optical index of refraction of the electrolyte is selected in this case to render the combination only slightly diffusing. However, when matter from the transparent electrolyte is deposited onto the transparent electrode the amount of light diffusion due to the rough surface of the electrode can be controlled by the amount deposited and its index of refraction relative to the electrode itself and the electrolyte.

In FIG. 6, which is similar to FIG. 2, the main electrode 12 is a thin transparent $SnO_2$ coating on a glass support 13 all inside of a glass container 10. The electrolytic cell consists of this main electrode 12 and a second transparent electrode 71 mounted on a glass support 70 with two electrolytes 75 and 76 and a salt bridge 72 between the electrodes. D.C. current is supplied through connections 73 and 74 to the electrodes 12 and 71.

The main electrolyte 75 contains metal ions which, in this example, are deposited on the electrode 12 when the latter is the cathode. The commoner forms of the present invention employ cathodic deposition. This deposition of metal on the electrode 12 increases the optical density of the cell system. The continuous salt bridge 72 isolates the electrolytes from each other, so that the ions cannot migrate to the wrong electrodes. The salt bridge layer 72 is preferably a gelatin layer saturated with a salt which may be potassium chloride when copper, nickel or cadmium ions are used in the electrolyte 75, or may be ammonium nitrate when silver or mercurous ions are used in the electrolyte 75.

The second electrolyte 76 which is preferably very thin, between .001 and .005 inch, contains transparent ions which undergo oxidation-reduction reactions without producing optical density. For example, innumerable (such as the nitriles) organic materials plate onto or off an electrode such as 71 as a transparent material A 9% solution of polyacrylamide dissolved in water operates quite well as the electrolyte 76.

The operation is as follows: When current is supplied through the connectors 73 and 74 with the electrode 12 as the cathode, the current flows through the polyacrylamide solution, through the salt bridge and through the electrolyte 75 to deposit metal on the electrode 12. When the current flows in the opposite direction, the metal plates off the electrode 12 and becomes an ion in the electrolyte 75. The metal ions flow to the layer 72 and remain at the surface thereof as transparent ions, releasing the salt ions (potassium or ammonium ions in the above examples) which continue the current flow through the layer 72. If the current were continued a long time, which it normally is not, there would probably be a migration (electrophoresis) of both ions of the salt in opposite directions. At the interface between the bridge layer 72 and the organic electrolyte 76 the potassium ions release the positive ion of the polyacrylamide. The reduction product of the polyacrylamide deposits (transparent) at the electrode 71. This is a reversible reaction and oxidation of this reduction product reforms polyacrylamide when the current is reversed.

Any organic or inorganic electrolyte, which has a transparent reduction product and for which the oxidation-reduction reaction is reversible, may be used as the electrolyte 76.

Figure 7:
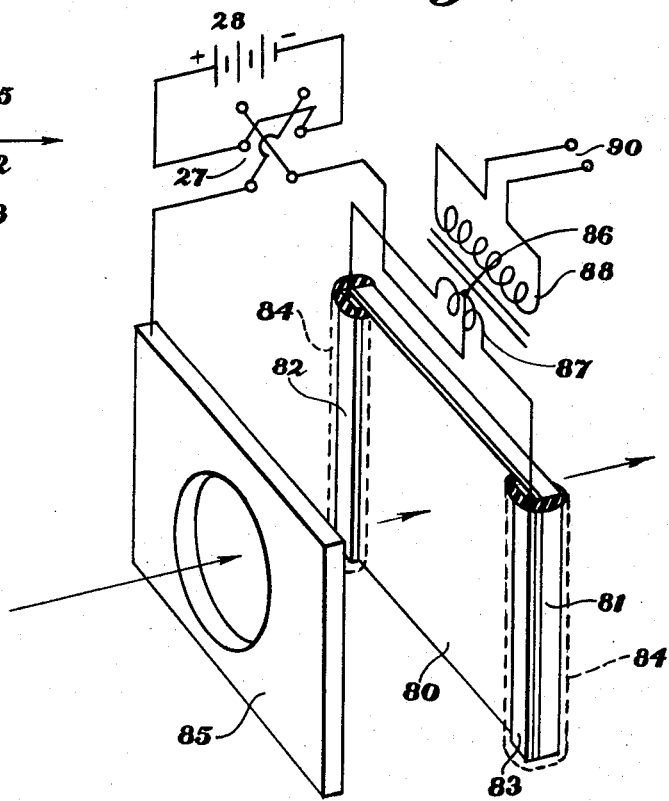
FIG. 7 is a perspective view of the electrode system in another special embodiment of the invention.

FIG. 7 shows only the electrodes and (schematically) the electrical connections thereto of a preferred embodiment of the invention. These electrodes are immersed in an electrolyte for example as shown in FIG. 1. In FIG. 7 the main electrode 80 is a thin transparent metal coated on a glass support 81. Contact is made to the two edges of the electrode 80 through highly conducting metal strips 82 and 83. The other electrode of the electrolytic system is shown as a ring electrode 85. D.C. current is supplied through a reversing switch 27 from a source indicated schematically at 28, just as in FIG. 1, except that the connection to the electrode 80, through the strips 82 and 83, is provided by a center tap 86 on the secondary 87 of a transformer whose primary is illustrated at 88. These strips 82 and 83 may be transparent or opaque and are insulated from the electrolyte (to prevent chemical and electrolytic action) by a lacquer layer 84 shown in broken lines.

Quite independent of the electrolytic action, an A.C. current may be provided between the strips 82 and 83 from a source 90. This A.C. current (an auxiliary D.C. current may alternatively be used) flowing through the electrode 80 itself serves various purposes. In the first place it controls the temperature of the electrode 80 and hence the temperature of the electrolyte in contact therewith, without reference to the current used for electrolytic printing. Thus the cell may be brought to its most efficient operating temperature even when the ambient temperature is very low, such as in a house window in winter time. Even more important, perhaps, is the fact that the potential drop between the electrode 80 and the electrode 85 moves back and forth across the electrode 80 during each cycle of the A.C. auxiliary current. This results in uniformity of plating onto and off the electrode 80. The electrodes 80 and 85 are very close together and the electroplating required for the present invention occurs between these two electrodes. Plating out between the strips 82 and 83 is negligible. Various other means for applying the auxiliary potential to the electrodes or to the cells, may be used. In the salt bridge system of FIG. 6, both electrodes may be transparent and each may be provided with an A.C. current between strips along the edges of the electrodes.

Figure 8:
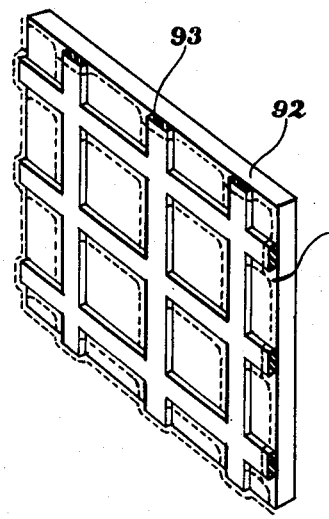
FIG. 8 is a perspective view, greatly enlarged of a detail of a preferred form of electrode for use in the invention.

In FIG. 8 a transparent electrode of high uniformity is illustrated. A transparent support 92 of glass or plastic is provided with a metal grid 93 of relatively high conductivity. A fairly thick layer of titanium dioxide and gold, deposited by vacuum evaporation may be used. The thickness of the coating should be such that the effective resistance is about 100 ohms per square. This measurement is made as if the layer were continuous. Such measurements are always quoted as per square since to a very close first order of approximation the resistance is the same whether measured with centimeter wide electrodes one centimeter apart or inch wide electrodes one inch apart. Hence the dimension is given in "ohms per square." The grid form is provided either by evaporating through a stencil or photo resist which is then removed leaving the square areas of the support 92 exposed between the lines of the grid or by evaporating a fairly thick layer covering it with photoresist which is converted to a stencil through the open areas of which etching solution is applied to remove metal. The photo resist is then removed leaving the metal grid 93.

The whole electrode is then vacuum coated a second time with titanium dioxide and gold. This time only a very thin layer 94, illustrated by dotted lines, is coated so as to cover the support 92 and the grid 93. That is, this thin layer 94 is on top of the grid, down the sides of the grid, and on the surface of the glass or plastic 92. The layer 94 is highly transparent but somewhat lower conductivity with a resistance of about 1000 ohms per square. The grid being a relatively good conductor serves to carry the current easily to all parts of the electrode so that there is a relatively uniform current flow from all areas of the electrode. A few examples of transparent electrodes are as follows:

A layer of gold-bismuth oxide having an optical transmission of 75% (a density of .13) has a specific resistance of only 6 ohms per square. Note that as pointed out above this is the accepted unit for specific resistance of a conducting film of unknown thickness; the resistance is essentially the same for any size square with the electrodes according to accepted standards. A layer of gold with this same density has a specific resistance of less than 5 ohms per square. Cadmium oxide of this same density has a specific resistance of about 80 ohms per square. Indium oxide of this same density has a resistance of about 1500 ohms per square. Tin oxide to an equivalent density has a specific resistance of about 3000 ohms per square, yet works quite satisfactorily.

Filters according to the present invention involve reversible reactions and hence can serve as electro-optical memories simply by controlling the polarity of the current applied to the system in accordance with the date to be remembered. When the electric field is removed from across the filter the optical density remains substantially constant for long periods of time. In a special embodiment of the invention the transparent electrode is a mosaic of separate electrodes any one or more of which may be energized at one time to plate or deplate.

On all embodiments the thickness of the electrolyte may be a thousandth of an inch or even less than a micron as long as there is room for the second electrode, but the latter requirement has, as a practical matter placed the lower limit at .001 inch. The walls of the container are usually thick enough to be rigid and strong. Since this is usually thicker than the minimum permissible for the electrolyte, it is not the present invention which places any real limitation on the overall thickness of the filter but the limiting factor is merely the requirement for mechanical strength.

Since the filter can be made quite opaque, it can be used as an optical shutter. In such case the filter starts from the opaque condition is deplated and then replated to "close" the shutter. In this case the current densities are above the range normally used for plating metals but the action is so brief that objectionable effect of gas formation is minimized. On the other hand, normal operation of the invention as a variable filter employs current densities far below those for normal plating of metals and at these low values, there are no adverse effects such as gas formation.

In some embodiments of the invention precise control is obtained by adding a chemical such as hydrochloric acid which chemically attacks the deposit as it is being made or removed from the transparent electrode. The rate of plating or deplating is faster than the rate of chemical removal and the net effect is the sum or difference of the two effects. The container must, of course, be one not attacked by the particular electrolyte used. When using fluoborate electrolytes, for example, which attack glass, it is preferable to have the container in the form of a plastic and at least the windows thereof should be transparent. Common electrolytes include copper perchlorate, acid zinc sulfate, lead nitrate and silver cyanide but these are only a few of the many examples which will work, such as those described in the above-mentioned "Metal Finishing Guidebook Director, 1957 Edition."

Replenishment of the electrolyte as is common in electroplating procedures, can be practiced with the present invention but usually is not necessary because of the low current densities and reuse of the deposited matter from the electrolyte.

The transparent electrode is usually made by sputtering or evaporating metals onto glass or other transparent support but chemical treatment of the glass as commonly used in producing so-called conducting glasses is preferable for very large electrodes.

The invention has been described in detail with particular reference to preferred embodiments thereof, but it will be understood that variations and modifications can be effected within the spirit and scope of the invention as described hereinabove and as defined in the appended claims.

We claim:

1. A variable density window comprising two parallel sheets of clear light-transmitting material separated a distance between .001 inch and .300 inch, a transparent electrolyte between the sheets containing ions of a material plateable as a nondiffusing material on an electrode, a flat transparent electrode between and substantially parallel to the sheets, onto or from which electrode the material plates when current passes through the electrolyte, a second electrode spaced from the first electrode in the electrolyte between the sheets, said second electrode covering only a minor portion of the areas of said window whereby light through the sheets passes through the transparent electrode and past the second electrode and means for applying D.C. potential in either direction between the electrodes to transfer material between the electrolyte and the surface of the transparent electrode.

2. A variable density window according to claim 1 in which the electrolyte is a transparent solution of a metallic compound and in which the transparent electrode and the surface of the second electrode each consists of conductors inert to the electrolyte.

3. A variable density window according to claim 1 in which the electrolyte contains sufficient gelatin to be solid at 90° F.

4. A variable density filter according to claim 1 in which the second electrode is effectively transparent and which includes between the two electrodes in addition to said transparent electrolyte containing ion of platable material in contact with the first electrode, a second electrolyte containing a material whose reduction product is transparent and a salt bridge layer between the two electrolytes to prevent migration of the ion of either electrolyte into the other electrolyte.

5. A variable density window according to claim 1 in which the second electrode is a mesh of fine wire uniformly spaced from the transparent electrode.

6. A variable density filter according to claim 1 in which the transparent electrode is a thin transparent coating on a transparent support with a fine grid between the coating and the support, said grid having a least ten times the area conductivity of the transparent coating.

7. A variable density window according to claim 1 in which the electrolyte chemically dissolves the deposited ion from the transparent electrode at a rate slower than that at which it may be deposited by electroplating, but sufficient to reduce the optical density by at least .01 unit per hour.

8. A light shutter for controlling the transmission of light comprising a sealed electrolytic cell containing a transparent electroplating bath, a transparent light-entrance window forming one wall of the cell and carrying on its inner surface a transparent electrically conducting layer, a transparent light-exit window forming a second wall of said cell, opposite and parallel to said light entrance window and spaced therefrom, said exit window carrying on its surface a transparent electrically conducting layer, the said conducting layers being in physical and electrical contact with the electroplating bath, an electrical circuit including an electrical power source connected to said conducting layers for supplying current thereto, and switching means for reversing the polarity of the current applied to said conducting layers.

9. A light shutter for controlling the transmission of light comprising an electrolytic cell containing a transparent electroplating bath, a transparent window forming one wall of the cell and carrying on its inner surface a transparent electrically conducting layer in physical and electrical contact with the electroplating bath, a second transparent window forming a second wall of said cell, opposite and parallel to the first mentioned window and spaced therefrom, a second electrode in physical and electrical contact with the electroplating bath, an electric circuit including an electrical power source connected to said conducting layer and second electrode for supplying current thereto, and switching means for reversing the polarity of such current.

References Cited in the file of this patent

UNITED STATES PATENTS

| | | |
|---|---|---|
| 1,525,554 | Jenks | Feb. 10, 1925 |
| 2,596,515 | Watkins et al. | May 31, 1952 |